US012681493B2

(12) United States Patent
Qian et al.

(10) Patent No.: US 12,681,493 B2
(45) Date of Patent: Jul. 14, 2026

(54) AIRCRAFT CONTROL METHOD AND APPARATUS, AIRCRAFT, AND STORAGE MEDIUM

(71) Applicant: SZ DJI TECHNOLOGY CO., LTD., Shenzhen (CN)

(72) Inventors: Jie Qian, Shenzhen (CN); Hualiang Qiu, Shenzhen (CN); Zhenzhou Lai, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/828,188

(22) Filed: Sep. 9, 2024

(65) Prior Publication Data

US 2024/0427347 A1 Dec. 26, 2024

Related U.S. Application Data

(63) Continuation of application No. PCT/CN2022/083368, filed on Mar. 28, 2022.

(51) Int. Cl.
G05D 1/48 (2024.01)
G05D 1/246 (2024.01)
(Continued)

(52) U.S. Cl.
CPC ............... G05D 1/48 (2024.01); G05D 1/246 (2024.01); G05D 1/622 (2024.01); G05D 1/652 (2024.01);
(Continued)

(58) Field of Classification Search
CPC .......... G05D 1/48; G05D 1/622; G05D 1/652; G05D 1/246; G05D 2109/20; G05D 2107/13; G05D 2103/00
See application file for complete search history.

(56) References Cited

U.S. PATENT DOCUMENTS 7,225,063 B2 * 5/2007 Tart ......................... B64C 13/18
701/4
9,704,408 B2 * 7/2017 Yu ........................... G05D 1/617
(Continued)

FOREIGN PATENT DOCUMENTS

CN 107368084 A 11/2017
CN 108351652 A 7/2018
(Continued)

OTHER PUBLICATIONS

International Search Report (Aug. 31, 2022).

*Primary Examiner* — Ramsey Refai

(57) ABSTRACT

A UAV control method, a device, a UAV, and a storage medium are provided. The method includes: obtaining a UAV's take-off position; obtaining a height map of an area around the take-off position; determining height information of a highest target in the area around the take-off position based on the height map; determining a relative height between the highest target and the take-off position based on the height information of the highest target; determining a restricted flight altitude of the UAV relative to the take-off position based on the relative height, and controlling the UAV based on the restricted flight altitude; where the restricted flight altitude is greater than or equal to the relative height. It thus can ensure flight safety while offering more reasonable and user-friendly flight flexibility and freedom.

20 Claims, 3 Drawing Sheets

(51) Int. Cl.
G05D 1/622 (2024.01)
G05D 1/652 (2024.01)
G05D 103/00 (2024.01)
G05D 107/13 (2024.01)
G05D 109/20 (2024.01)

(52) U.S. Cl.
CPC ..... *G05D 2103/00* (2024.01); *G05D 2107/13* (2024.01); *G05D 2109/20* (2024.01)

(56) References Cited

U.S. PATENT DOCUMENTS

| | | | | |
|---|---|---|---|---|
| 9,977,428 | B2 * | 5/2018 | Hall | G08G 5/26 |
| 10,755,584 | B2 * | 8/2020 | Stewart | G08G 5/26 |
| 2008/0247078 | A1 | 10/2008 | Yao et al. | |
| 2016/0225264 | A1 * | 8/2016 | Taveira | H04W 4/021 |
| 2016/0253907 | A1 * | 9/2016 | Taveira | G08G 5/57 |
| | | | | 701/3 |
| 2017/0046960 | A1 | 2/2017 | Bernhardt et al. | |
| 2023/0109847 | A1 * | 4/2023 | Gurusamy | G08G 5/53 |
| | | | | 701/9 |

FOREIGN PATENT DOCUMENTS

| | | | |
|---|---|---|---|
| CN | 109661694 | A | 4/2019 |
| CN | 110709791 | A | 1/2020 |
| CN | 111103895 | A | 5/2020 |
| CN | 113874804 | A | 12/2021 |
| JP | 2019104307 | A | 6/2019 |
| WO | 2021016867 | A1 | 2/2021 |

* cited by examiner

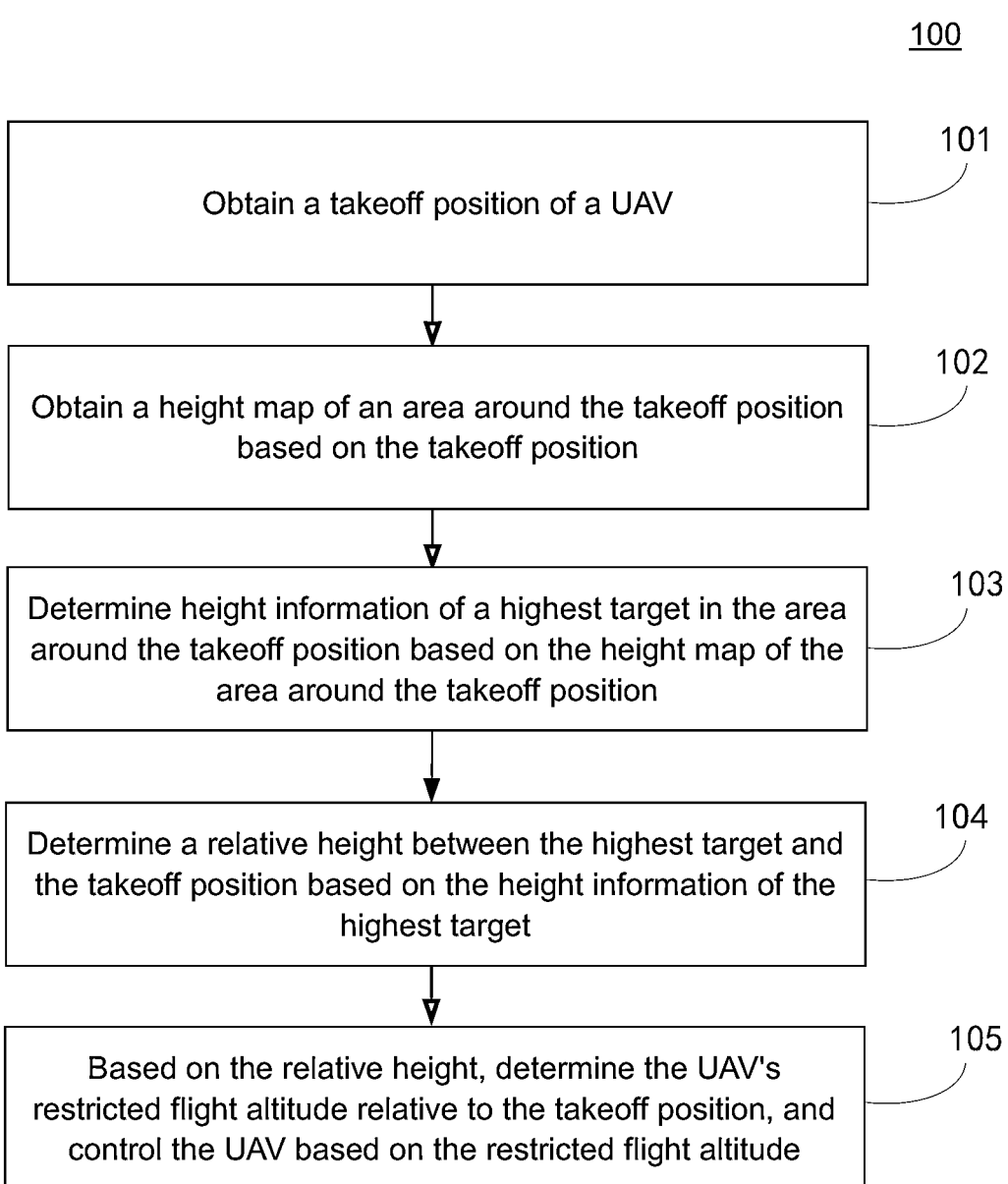

100

Obtain a takeoff position of a UAV

101

Obtain a height map of an area around the takeoff position based on the takeoff position

102

Determine height information of a highest target in the area around the takeoff position based on the height map of the area around the takeoff position

103

Determine a relative height between the highest target and the takeoff position based on the height information of the highest target

104

Based on the relative height, determine the UAV's restricted flight altitude relative to the takeoff position, and control the UAV based on the restricted flight altitude

AIRCRAFT CONTROL METHOD AND APPARATUS, AIRCRAFT, AND STORAGE MEDIUM

RELATED APPLICATIONS

This application is a continuation application of PCT application No. PCT/CN2022/083368, filed on Mar. 28, 2022, and the content of which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates to the technical field of unmanned aerial vehicle (UAV) control, and in particular to an unmanned aerial vehicle (UAV) control method and apparatus, an unmanned aerial vehicle (UAV), and a storage medium.

BACKGROUND

Currently, for flight safety or to comply with government flight regulatory agencies' requirements, UAVs are set with a flight altitude limit relative to the take-off position. A UAV's controller can restrict the UAV from flying above this limit. At present, the UAV's flight altitude limit is a default value. However, this flight restriction strategy is very user-unfriendly in certain situations. For example, a user might want to shoot the roof of a building. If the user takes off the UAV from a relatively low-lying area next to the building, even if the building's height is less than the flight altitude limit, the UAV might reach the flight altitude limit before reaching the roof, making it impossible to get to the roof. This is obviously unreasonable and user-unfriendly.

SUMMARY

Embodiments of the present disclosure provide a control method and device, a UAV, and a storage medium, aiming to enhance the flight freedom of UAVs and improve user experience while ensuring UAV flight safety.

In a first aspect, the present disclosure provides a method for controlling an aircraft, including: obtaining a restricted flight altitude of a take-off position of the aircraft, where the restricted flight altitude is related to height information of a highest target in an area around the take-off position; and controlling, based at least in part on the restricted flight altitude, the aircraft.

In a second aspect, the present disclosure provides a control device for controlling an aircraft, including: at least one storage medium storing at least one set of instructions; and at least one processor in communication with the at least one storage medium, where during operation, the at least one processor executes the at least one set of instructions to cause the control device to at least: obtain a restricted flight altitude of a take-off position of the aircraft, where the restricted flight altitude is related to height information of a highest target in an area around the take-off position, and control, based at least in part on the restricted flight altitude, the aircraft.

In a third aspect, the present disclosure provides a non-transitory computer-readable storage medium including a set of instructions for controlling an aircraft, where when executed by at least one processor, the set of instruction directs the at least one processor to perform: obtaining a restricted flight altitude of a take-off position of the aircraft, where the restricted flight altitude is related to height information of a highest target in an area around the take-off position; and controlling, based at least in part on the restricted flight altitude, the aircraft.

In the technical solutions provided herein, the flight altitude limit relative to the take-off position is determined based on the location of the take-off position and the height information of a highest target in the surrounding area of the take-off position. That is, the flight altitude limit relative to different take-off positions varies and is not a default value as in the existing technology. Therefore, the technical solutions provided herein are more reasonable while ensuring flight safety, offers more flight freedom for users, and is more user-friendly.

BRIEF DESCRIPTION OF THE DRAWINGS

The accompanying drawings are provided to further understand this disclosure and constitute a part thereof. The illustrative embodiments and their descriptions provided herein are used to explain the present disclosure and do not improperly limit the scope of this disclosure. In the drawings:

FIG. 1 is a schematic flowchart of a control method/process according to some exemplary embodiments of the present disclosure;

DETAILED DESCRIPTION

Figure 2:
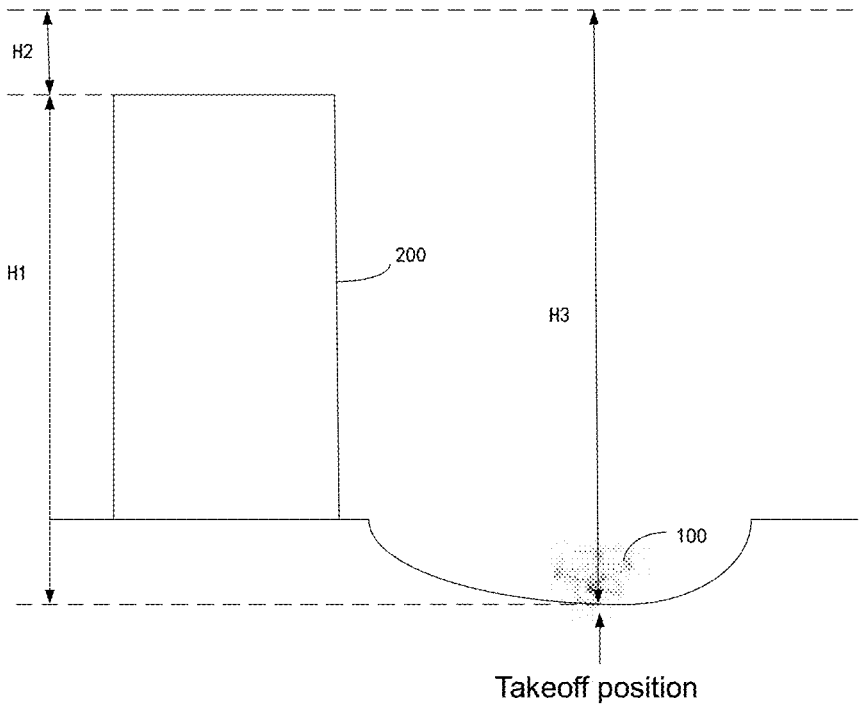
FIG. 2 is an application example diagram according to some exemplary embodiments of the present disclosure.

To make the objectives, technical solutions, and advantages of the embodiments of this disclosure clear, the technical solutions in the embodiments of this disclosure will be described in conjunction with the accompanying drawings. It is evident that the described embodiments are part of the embodiments of this disclosure and not all of them. Based on these exemplary embodiments of this disclosure, all other embodiments obtained by a person of ordinary skill in the art without making inventive work fall within the scope of protection of this disclosure.

Unless otherwise defined, all technical and scientific terms used herein have the same meaning as commonly understood by a person of ordinary skill in the art. The terminology used in the description of this disclosure is intended only to describe particular exemplary embodiments and is not intended to limit the scope of this disclosure.

To facilitate understanding of the technical solutions and technical effects of this disclosure, a brief description of the existing technology is provided below.

In the current altitude limit solutions, the relative altitude during flight is detected using a barometer with reference to the take-off position (i.e., taking the elevation height of the UAV take-off position as the zero point). A UAV is controlled so that its relative altitude does not exceed the default flight altitude limit (for example, 200 meters) relative to the take-off position. As the analysis above shows, this altitude limit strategy is unreasonable and very user-unfriendly in certain situations. Continuing with the application scenario mentioned in the background technology, if a user wants to continue shooting the roof of a building, the user must make the UAV return, then take the UAV to a place approximately as high as the base of the building and make it take off again. This results in high operational costs and poor user experience.

To address or partially resolve the above issues, embodiments of this disclosure provide a UAV control method. In this method, the flight altitude limit relative to the take-off position is determined based on the location of the take-off position and the height information of a highest target in the surrounding area. That is, the flight altitude limit relative to different take-off positions may vary and is not a default value as in the existing technology. Therefore, the technical solutions provided herein are more reasonable while ensuring the flight safety, offers greater flight freedom for users, and is more user-friendly.

Some exemplary embodiments of this disclosure will be described in detail below with reference to the accompanying drawings. The embodiments and features of the embodiments described below can be combined with each other as long as they do not conflict.

FIG. 1 is a schematic flowchart of a control method/process according to some exemplary embodiments of the present disclosure. This control method can be applied to UAVs, the control terminals of UAVs, and/or servers. Information can be exchanged between the UAV and the control terminal. The control terminal can be used to transmit control data to the UAV and/or receive data sent by the UAV via a wireless communication link between the UAV and the control terminal. In some cases, the UAV exchanges information with the server via the control terminal, and in some cases, information is exchanged directly between the UAV and the server. Specifically, the execution subject of this control method can be the UAV; or the execution subject can be the control terminal of the UAV; or the execution subject can be the server. Alternatively, the execution subject can include both the UAV and the control terminal, with information exchanged therebetween; or it can include both the UAV and the server, with information exchanged between them. Furthermore, the execution subject of the control method can be the control device of the UAV, which can be located on the UAV, the UAV's control terminal, or the server. Alternatively, part of the UAV's control device can be located in one of the UAV, the control terminal, or the server, and another part of the control device can be located in another one of the UAV, the control terminal, or the server. Moreover, some or all aspects of the process (or any other processes described herein, or variations and/or combinations thereof) may be performed by one or more processors onboard a movable object, a remote control device, any other system or device or a combination thereof. Some or all aspects of the process (or any other processes described herein, or variations and/or combinations thereof) may be performed under the control of one or more computer/ control systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program including a plurality of instructions executable by one or more processors. The computer-readable storage medium may be non-transitory. The order in which the operations are described is not intended to be construed as a limitation, and any number of the described operations may be combined in any order and/or in parallel to implement the processes. As shown in FIG. 1, the method includes:

S101. Obtain a take-off position of a UAV.

S102. Obtain a height/elevation map of an area around the take-off position based on the take-off position.

S103. Determine height information of a highest target in the area around the take-off position based on the height map of the area around the take-off position.

S104. Determine a relative height between the highest target and the take-off position based on the height information of the highest target.

S105. Based on the relative height, determine the UAV's restricted flight altitude relative to the take-off position, and control the UAV based on the restricted flight altitude.

The restricted flight altitude is greater than or equal to the relative height.

In S101, typically, the UAV is equipped with a positioning device, which may include a satellite positioning system. Therefore, the UAV can determine the location of its take-off position with its internal positioning device. The UAV can determine the take-off position at the time of take-off using the positioning device. Specifically, the current location can be set as the take-off position upon receiving a take-off command/instruction. For example, the take-off position may include latitude and longitude information as well as elevation/height information. The UAV's control device can obtain the take-off position's location.

In S102, the height map of the area surrounding the take-off position may include latitude and longitude information and height/elevation information for various locations within the surrounding area. Alternatively, the height map may include the latitude and longitude information and height/elevation information of various targets within the surrounding area. This height/elevation information can be the elevation above sea level. In some cases, the height/elevation information can also use certain reference planes other than sea level as the reference plane.

The range of the area surrounding the take-off position can be determined according to actual needs. In one feasible scheme, the range of the area surrounding the take-off position can be determined based on the UAV's maximum flight distance. For example, if the UAV's maximum flight distance is 2 km, the range of the area surrounding the take-off position would be a circular area with a 2 km radius centered on the take-off position. In another feasible scheme, the range of the area surrounding the take-off position is determined by the user's range setting operation detected by the UAV's control terminal. Specifically, the control terminal can provide the user with a range setting interface, display a map on this interface, and receive the user's range delineation operations on the map to determine the aforementioned range.

In S103, search the height map of the area surrounding the take-off position for the height information of the highest target in that area. Specifically, find the maximum height information from the height data included in the height map of the area surrounding the take-off position to use as the height information of the highest target.

In S104, determine the relative height between the highest target and the take-off position based on the height information of the highest target. Specifically, determine the relative height between the highest target and the take-off position based on the height information of the highest target and the height information of the take-off position. For example, if the height information of the highest target is H and the height information of the take-off position is h, then the relative height between the highest target and the take-off position is H-h.

In S105, in one example, the relative height can be directly used as the UAV's restricted flight altitude relative to the take-off position. This ensures that after taking off from the current take-off position, the UAV can fly over any target within the surrounding area, such as buildings, trees, or mountain peaks.

In another example, to ensure the UAV's flight safety, the restricted flight altitude can be greater than the relative height. The specific amount by which it is greater can be set according to actual conditions. In a specific example, the method may also include:

S106. Obtain a safety height value.

Accordingly, in the aforementioned S105, the determining of the UAV's restricted flight altitude relative to the take-off position based on the relative height may include:

S1051. Determine the UAV's restricted flight altitude relative to the take-off position based on the relative height and the safety height value.

As shown in FIG. 2, the relative height between the highest target 200 and the UAV 100's take-off position is H1. The sum of the relative height H1 and the safety height value H2 can be used as the UAV 100's restricted flight altitude H3 relative to the take-off position. The safety height value can be set according to actual conditions, for example, 20 meters.

The safety height value can be set by default; or it can be determined based on user height settings detected by the UAV's control terminal, allowing users to set it according to flight conditions. Specifically, the UAV's control terminal can provide a height setting operation interface. For example, this interface can offer multiple selectable safety height values. Based on the detected user height settings on this interface, the safety height value selected by the user can be determined.

In the aforementioned S105, the UAV is controlled according to the determined restricted flight altitude, meaning that the UAV's relative flight altitude relative to the take-off position during flight should not exceed the determined restricted flight altitude.

In the technical solution provided by some exemplary embodiments of this disclosure, the restricted flight altitude relative to the take-off position is determined based on the location of the take-off position and the height information of the highest target in the surrounding area. In other words, the restricted flight altitude relative to different take-off positions varies, rather than being a default value as in the existing technology. Thus, the technical solution provided by this application is more reasonable for ensuring flight safety, offering users greater flight freedom and being more user-friendly.

In practical applications, the determination of the relative height between the highest target and the take-off position in the aforementioned S104 may include:

1041. Determine whether the take-off position is lower than the highest target based on the height information of the highest target and the height information of the take-off position.

If the take-off position is lower than the highest target, then determine the relative height between the highest target and the take-off position based on the height information of the highest target.

Furthermore, the method may also include:

106. If the take-off position is not lower than the highest target, obtain a safety height value, and use this safety height value as the restricted flight altitude of the UAV relative to the take-off position.

Furthermore, the method may further include the following step:

107. Display the restricted flight altitude.

108. Send the restricted flight altitude to the UAV's control terminal so that the control terminal displays the restricted flight altitude.

In practical applications, when the execution subject of the above control method is the UAV's control terminal, the control terminal can display the determined restricted flight altitude. When the execution subject is the UAV or a server, the determined restricted flight altitude can be sent to the UAV's control terminal so that the control terminal displays the determined restricted flight altitude.

Displaying the determined restricted flight altitude on the UAV's control terminal makes it easier for users to understand the situation, especially in scenarios where the UAV is manually controlled, as it helps users plan the flight path.

In some exemplary embodiments, the method described in step 102 involves obtaining a height map of the area around the take-off position based on the location of the take-off position, including:

1021a. Obtain a building height map and/or terrain map of the area around the take-off position based on the location of the take-off position, which will be used as an obtaining result.

1022a. Determine the height map of the area around the take-off position based on the obtaining result.

In an implementable solution, the phrase "obtain a building height map and/or terrain map of the area around the take-off position based on the location of the take-off position" in step 1021a may specifically include:

S11. If the UAV is determined to be in an urban area based on the location of the take-off position, obtain a building height map of the area around the take-off position based on the location of the take-off position.

The determination of whether the UAV is in an urban area can be based on the location of the take-off position and a map.

Correspondingly, in step 1022a, the determining of the height map of the area around the take-off position based on the obtaining result includes:

S21. Determine the height map of the area around the take-off position based on the building height map of the area around the take-off position.

The building height map of the area around the take-off position includes the latitude and longitude information and height information of buildings in the area surrounding the take-off position. In one example, the building height map of the area around the take-off position can be used as the height map of the area around the take-off position.

In another implementable solution, the obtaining of the building height map and/or terrain map of the area around the take-off position based on the location of the take-off position in step 1021a may specifically include:

S12. If the UAV is determined to be in a non-urban area based on the location of the take-off position, obtain a terrain map of the area around the take-off position based on the location of the take-off position.

If the UAV is in a non-urban area, such as rural or mountainous regions, a terrain map may be used.

Correspondingly, in step 1022a, the determining of the height map of the area around the take-off position based on the acquisition result may specifically include:

S22. Determine the height map of the area around the take-off position based on a terrain map of the area around the take-off position.

In one example, the terrain map of the area around the take-off position can be used as the height map of the area around the take-off position.

In another implementable solution, the obtaining of the building height map and/or terrain map of the area around the take-off position based on the location of the take-off position in step 1021a may specifically include:

S13, Obtain a building height map and a terrain map of the area around the take-off position according to the position of the take-off position.

Correspondingly, the above 1022a determines the height map of the area around the take-off position according to the obtaining result, which may specifically include:

S23, Fuse the building height map and the terrain map of the area around the take-off position to determine the height map of the area around the take-off position.

Specifically, the building height map of the area around the take-off position includes the height information of each building; the terrain map of the area around the take-off position includes the terrain height/elevation at each location. Specifically, the terrain map may be corrected according to the building height map to obtain the height map of the area around the take-off position; or, the building height map can be corrected according to the terrain map to obtain the height map of the area around the take-off position.

In Some exemplary embodiments, by integrating the building height map and the terrain map of the area around the take-off position to obtain the height map information of the area around the take-off position, the information will be more comprehensive, which helps to improve flight safety.

Taking a UAV or a control terminal of the UAV as an example of the execution subject for the above control method, the building height map and/or terrain map of the area around the take-off position can be obtained from a server. Specifically, in step 1021a, the obtaining of the building height map and/or terrain map of the area around the take-off position based on the position of the take-off position includes:

S11: Send the take-off position to the server.

S12: Receive the building height map and/or terrain map of the area around the take-off position from the server, which are retrieved from a storage device based on the take-off position.

The server can pre-store building height maps and/or terrain maps of various regions in a storage device. For example, the regions can be a district (e.g., Xicheng District in Beijing), a city (e.g., Beijing), or a country (e.g., China). The storage device can be a local storage device of the server or an external storage device that the server can access.

Specifically, the server can determine the target region where the take-off position is located based on the take-off position; retrieve the building height map and/or terrain map of the target region from the storage device, and determine the building height map and/or terrain map of the area around the take-off position based on the retrieved building height map and/or terrain map.

In another instance, the obtaining of the height map of the area around the take-off position based on the take-off position includes:

1021b: Send the take-off position to a server.

1022b: Receive the height map of the area around the take-off position sent by the server.

In this case, the height map of the area around the take-off position is retrieved by the server from the storage device based on the received take-off position.

The server can pre-store height maps of various regions in a storage device. Based on the take-off position, the server can determine the target region where the take-off position is located and determine the height map of the area around the take-off position based on the height map of the target region. In one instance, the height map of each region can be determined based on the building height map and/or terrain map of that region. In another instance, since the aircraft has a positioning system and an environmental observation system, and given that the number of UAVs has reached a substantial amount, there is environmental observation wherever these UAVs fly. This environmental observation data can be transmitted back to the server via the network, thereby constructing safe flight heights in various environments, such as the minimum safe flight height. There are two ways to observe the environment: direct observation with stereo vision and indirect observation with sky detection at a distance. The specific observation methods can be found in existing technologies and will not be detailed herein. Specifically, the height map includes a first height map generated based on sensor data collected by UAVs that have flown in the area around the take-off position. The first height map includes latitude and longitude information and height information for each location point. In another instance, the height map is determined based on at least two of the first height map, the building height map and the terrain map of the area around the take-off position.

The building height map and terrain map mentioned above can be obtained from third-party map database/library companies. The terrain map is obtained through satellite measurements, which provide terrain height; the building height map is obtained through ground surveying, which provides the height of surveyed buildings and has higher precision than the terrain map. These two types of maps can be used in combination. Satellite-measured terrain maps are suitable for operations in non-urban environments, while building height maps (also known as high-precision maps) are suitable for urban environment operations.

In practical applications, the steps of determining the restricted flight altitude and controlling the UAV based on the determined restricted flight altitude can be executed if it is determined that the UAV's control device has the permission to set the restricted flight altitude; otherwise, the steps are not executed, and the UAV can be controlled directly based on a default fixed restricted flight altitude.

Specifically, the method may also include:

109. Determine whether it is permitted to set the restricted flight altitude.

One or more of the following methods can be used to determine whether the UAV's control device has the permission to set the restricted flight altitude:

Method 1: Determine whether it is permitted to set the restricted flight altitude based on the position of the take-off position.

In practical applications, certain areas, such as school zones or residential areas, have higher safety requirements and may not be permitted to set a restricted flight altitude. Therefore, a list of regions where setting a restricted flight altitude is permitted (List 1) or a list of regions where setting a restricted flight altitude is not permitted (List 2) can be pre-established. Subsequently, determine the target region based on the position of the take-off position. In one instance, check if the target region is in List 1; if it is, it is determined that the permission to set the restricted flight altitude is available; if it is not found in List 1, it is determined that the permission to set the restricted flight altitude is not available. In another instance, check if the target region is in List 2; if it is, it is determined that the permission to set the restricted flight altitude is not available; if it is not found in List 2, it is determined that the permission to set the restricted flight altitude is available.

Method 2: Determine whether there is permission to set the restricted flight altitude based on identity information associated with the UAV.

With the control scheme provided herein, the UAV can fly to higher altitudes or set restricted flight altitudes more flexibly compared to existing technologies. To ensure flight safety, UAV operators need to have better flight control capabilities. Therefore, whether the permission to set the restricted flight altitude is available can be determined based on the identity information associated with the UAV. This identity information can include the UAV's own identity information (e.g., serial number) or the identity information of the UAV operator (e.g., ID number, UAV operation certificate number, etc.). Furthermore, in some exemplary embodiments, the flight skill level of the UAV operator can be determined based on the identity information associated with the UAV. The permission to set the restricted flight altitude can then be determined based on the flight skill level. For example: if the flight skill level is higher than or equal to a preset flight skill level, the permission to set the restricted flight altitude is granted; if the flight skill level is lower than the preset flight skill level, the permission to set the restricted flight altitude is not granted.

Method 3: Determine whether an electronic certificate for setting the restricted flight altitude, certified by a flight regulatory authority, has been obtained. If it is determined that such an electronic certificate has been obtained, the permission to set the restricted flight altitude is granted.

UAV operators can apply for an electronic certificate for setting the restricted flight altitude on a network platform from a flight regulatory authority. The flight regulatory authority can determine whether to approve the application based on the UAV's flight performance and/or the qualifications of the UAV operator, such as the UAV flight skill level. If the application is approved, the UAV operator will be issued an electronic certificate for setting the restricted flight altitude, certified by the flight regulatory authority. The UAV's control device can obtain this electronic certificate, which can be retrieved from the server of the flight regulatory authority.

If the electronic certificate for setting the restricted flight altitude, certified by the flight regulatory authority, is not obtained, it is determined that the permission to set the restricted flight altitude is not available.

Correspondingly, in step 105, determining the restricted flight altitude of the UAV relative to the take-off position based on the height information of the highest target, and controlling the UAV according to the determined restricted flight altitude includes: if the permission to set the restricted flight altitude is available, determining the restricted flight altitude of the UAV relative to the take-off position based on the height information of the highest target, and controlling the UAV according to the determined restricted flight altitude.

Furthermore, the method may also include:

110. If there is no permission to set the restricted flight altitude, obtain a fixed restricted flight altitude relative to the take-off position, and control the UAV according to this fixed restricted flight altitude.

The fixed restricted flight altitude is predefined and fixed. Specifically, control the UAV so that during flight, the relative flying height of the UAV with respect to the take-off position does not go beyond this fixed restricted flight altitude.

Furthermore, in step 109, "determining whether there is permission to set the restricted flight altitude" may specifically include: after receiving the user's action to enable the setting of the restricted flight altitude, determine whether there is permission to set the restricted flight altitude.

In some exemplary embodiments, the user chooses whether to enable the permission to set the restricted flight altitude. If the user does not enable it, obtain a fixed restricted flight altitude relative to the take-off position and control the UAV according to this fixed restricted flight altitude.

In the above exemplary embodiments, the determined restricted flight altitude is used to define the maximum flight height of the UAV relative to the take-off position. In practical applications, the maximum altitude that the UAV can reach may also be determined. Specifically, the following steps can be taken: determine the flight position of the UAV, based on the flight position, obtain the height map of the area around the flight position, determine the height information of the highest target in the surrounding area based on the height map, and determine the maximum altitude that the UAV can reach in the area around the flight position based on the height information of the highest target. In one instance, the sum of the height information of the highest target and the safety flight height can be used as the maximum altitude that the UAV can reach in the area around the flight position. The flight position can be the take-off position or any position during the flight. The method for determining the size of the surrounding area can refer to the corresponding content in the above implementations and will not be detailed herein.

Currently, although the use of UAVs, especially aerial photography UAVs, is becoming increasingly popular, there are still safety concerns because the operational area of aerial photography UAVs is in the air and operated remotely by the user. The biggest safety concern is height control. External to the UAV: The UAV is subject to observational limitations in the air, such as observation blind spots and timing, making it difficult to fully grasp the surrounding environment. If a collision with another aircraft occurs, the consequences can be severe, so the height restrictions for UAVs are often quite strict. Internal to the UAV: Currently, UAVs can only observe the surrounding environment through onboard sensors, which may be unreliable and may lead to missed or incorrect detections, potentially causing collisions with obstacles.

This disclosure aims to enhance the safety and efficiency of height restrictions and return functions for UAVs by means of the use of prior elevation/height map data. Existing height restriction solutions have numerous limitations, particularly on uneven terrain, which may not meet the needs of aerial photography tasks, as described in the background technology. Current return solutions use path planning methods to chart a route from the current point back to the take-off position. When encountering obstacles along the path, obstacle avoidance actions are executed. However, these solutions have shortcomings: At night, it is not possible to observe the surrounding environment, making obstacle avoidance ineffective. Obstacles like white walls or glass may cause obstacle avoidance to fail. The planned trajectory, lacking environmental information, may not be optimal. If an obstacle is encountered during a return process and the UAV climbs but does not surpass the fixed height restriction, the UAV may become stuck and unable to continue returning home.

It should be noted that, in addition to return tasks, other automated tasks, such as one-click video clips, can also benefit from prior elevation/height maps to make automated tasks more efficient and safer. Return functions can use prior elevation/height map data on urban building locations and heights to plan more reasonable and safer return paths. One-click video clips require the camera to always face the target, and many UAVs lack omnidirectional obstacle avoidance capabilities. By using prior elevation/height maps, which provide information about obstacle locations in advance, automated tasks can be made safer. Integrating prior elevation/height maps can not only enhance flight safety but also improve the rationality of flight path planning.

Taking automated tasks as an example, obtain the take-off position of the UAV; based on the take-off position, obtain a height map of an area around the take-off position; and plan the UAV's flight path according to the height map and a fixed restricted flight altitude of the UAV relative to the take-off position.

Specifically, a user can determine the maximum flight height that the UAV can reach based on the height of the UAV's take-off position and the fixed restricted flight altitude relative to the take-off position; then plan the UAV's flight path based on the maximum flight height and the height of various targets in the height map to avoid targets that are higher than the maximum flight height.

Figure 3:
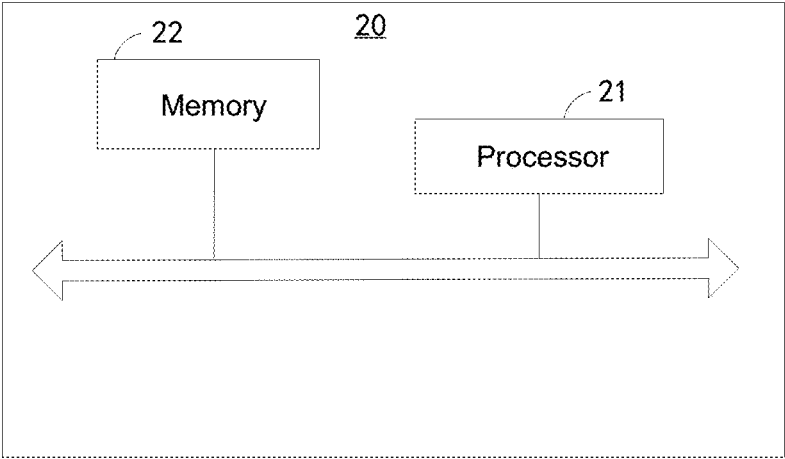
FIG. 3 is a structural block diagram of a control device according to some exemplary embodiments of the present disclosure.

FIG. 3 illustrates a schematic diagram of the structure of a UAV control device according to some exemplary embodiments of this disclosure, where the UAV control device can execute the UAV control method described earlier. As shown in FIG. 3, the control device 20 includes: at least one memory 22 and at least one processor 21. Moreover, the functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The at least one memory 22 is used to store programs;

The at least one processor 21, coupled with the memory 22, is used to execute the programs stored in the at least one memory 22, for performing the following steps:

Obtain a take-off position of a UAV;

Obtain a height map of an area around the take-off position based on the take-off position;

Determine height information of a highest target in the area around the take-off position based on the height map of the area around the take-off position;

Based on the height information of the highest target, determine the relative height between the highest target and the take-off position;

Based on the relative height, determine a restricted flight altitude of the UAV relative to the take-off position, and control the UAV according to the determined restricted flight altitude;

The restricted flight altitude is greater than or equal to the relative height.

Figure 4:
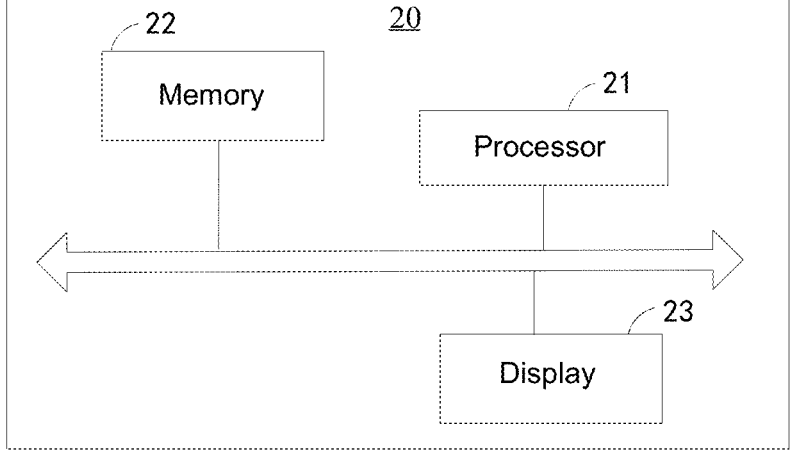
FIG. 4 is a structural block diagram of a control device according to some exemplary embodiments of the present disclosure.

In some exemplary embodiments, as shown in FIG. 4, a device 20 further includes:

A display 23 for showing the determined restricted flight altitude; or

Figure 5:
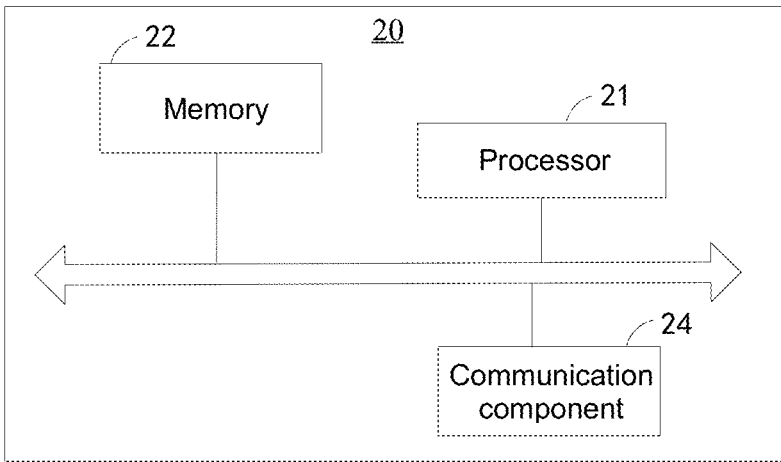
FIG. 5 is a structural block diagram of a control device according to some exemplary embodiments of the present disclosure.

As shown in FIG. 5, the device 20 further includes:

A communication component 24 for sending the determined restricted flight altitude to the UAV's control terminal so that the control terminal can display the determined restricted flight altitude.

In some exemplary embodiments, the processor 21 is also used to:

Obtain a safety height value;

Determine the restricted flight altitude of the UAV relative to the take-off position based on the relative height and the safety height value.

In some exemplary embodiments, the safety height value is determined based on a height-setting operation detected by the UAV's control terminal.

In some exemplary embodiments, the processor 21 is also used to:

Obtain a building height map and/or terrain map of the area around the take-off position based on the take-off position as an obtaining result;

Determine the height map of the area around the take-off position based on the obtaining result.

In some exemplary embodiments, the processor 21 is also used to:

Send the take-off position to a server;

Receive from the server the building height map and/or terrain map of the area around the take-off position, which the server has retrieved from a storage device based on the take-off position.

In some exemplary embodiments, the processor 21 is also used to:

Determine that the UAV is in an urban area based on the take-off position, then obtain a building height map of the area around the take-off position based on the take-off position;

Determine the height map of the area around the take-off position based on the building height map of the area around the take-off position.

In some exemplary embodiments, the processor 21 is also used to:

If it is determined that the UAV is in a non-urban area based on the take-off position, obtain a terrain map of the area around the take-off position based on the take-off position;

Determine the height map of the area around the take-off position based on the terrain map of the area around the take-off position.

In some exemplary embodiments, the processor 21 is also used to:

Obtain the building height map and terrain map of the area around the take-off position based on its location;

Fuse the building height map and terrain map of the area around the take-off position to determine the height map of the area around the take-off position.

In some exemplary embodiments, the processor 21 is also used to:

Send the take-off position to a server;

Receive from the server the height map of the area around the take-off position, where the height map is retrieved by the server from a storage device based on the received location of the take-off position.

In some exemplary embodiments, the height map includes a first height map generated based on sensor data collected by UAVs that have flown over the area around the take-off position.

In some exemplary embodiments, the processor 21 is also used to:

Determine whether there is permission to set a restricted flight altitude;

If permission is granted, determine the restricted flight altitude of the UAV relative to the take-off position based on the height information of the highest target, and control the UAV according to the determined restricted flight altitude.

In some exemplary embodiments, the processor 21 is also used to:

If there is no permission to set a restricted flight altitude, obtain a fixed restricted flight altitude relative to the take-off position, and control the UAV according to the fixed restricted flight altitude.

In some exemplary embodiments, the processor 21 is also used to:

Determine whether there is permission to set a restricted flight altitude based on the location of the take-off position.

In some exemplary embodiments, the processor 21 is also used to:

Determine whether there is permission to set a restricted flight altitude based on the identity information associated with the UAV.

In some exemplary embodiments, the processor 21 is also used to:

Determine whether an electronic certificate for setting a restricted flight altitude, certified by the flight regulatory authority, has been obtained;

If it is determined that the restricted flight altitude setting electronic certificate has been obtained, determine that there is permission to set the restricted flight altitude.

In some exemplary embodiments, the processor 21 is also used to:

After receiving a user operation to enable the permission for setting the restricted flight altitude, determine whether there is permission to set the restricted flight altitude.

Some exemplary embodiments of this disclosure provide a UAV. This UAV includes any of the aforementioned control devices.

Some exemplary embodiments of this disclosure provide a control terminal. This control terminal includes any of the aforementioned control devices. The control terminal establishes a wireless communication connection with the UAV.

Some exemplary embodiments of this disclosure provide a server. This server includes any of the aforementioned control devices. The server establishes a wireless communication connection with the UAV.

Some exemplary embodiments of this disclosure provide a computer-readable storage medium, which stores program instructions. These program instructions are used to implement the steps or functions of the control method provided by the aforementioned method embodiments.

The technical solutions and features in the various exemplary embodiments above can be used individually or in combination, as long as they do not exceed the scope of knowledge of a person skilled in the art, and are considered equivalent embodiments within the scope of this disclosure.

In the exemplary embodiments provided herein, it should be understood that the disclosed relevant detection devices (e.g., IMU) and methods can be implemented in other ways. For example, the remote control device embodiments described above are merely illustrative. The division of modules or units is just one logical functional division, and other ways of division may be used in actual implementation. For instance, multiple units or components may be combined or integrated into another system, or some features may be omitted or not executed. Additionally, the coupling or direct coupling or communication connections shown or discussed can be achieved through various interfaces, and indirect coupling or communication connections of the remote control device or units can be electrical, mechanical, or other forms.

The units described as separate components may or may not be physically separated. Components displayed as units may or may not be physical units; they can be located in a single place or distributed across multiple network units. Depending on the actual needs, some or all of these units can be selected to achieve the objectives of the embodiments of this disclosure.

Additionally, in the various embodiments of this disclosure, each functional unit can be integrated into a single processing unit, or the units can physically exist separately, or two or more units can be integrated into one unit. The integrated units can be implemented in hardware form or in the form of software functional units.

If the integrated units are implemented as software functional units and sold or used as standalone products, they can be stored on a computer-readable storage medium. Based on this understanding, the technical solutions of this disclosure, or the contributions made to the existing technology, can be embodied in the form of a software product. This computer software product, stored on a storage medium, includes several instructions that enable a computer processor to execute all or part of the steps of the methods described in the embodiments of this disclosure. The storage medium includes various types such as USB drives, external hard drives, read-only memory (ROM), random access memory (RAM), disks, or optical discs, and any other media capable of storing program code.

The above descriptions are merely exemplary embodiments of this disclosure and do not limit the scope thereof. Any equivalent structures or processes transformations made using the content in the description and drawings, or applied directly or indirectly to other related technical fields, are included within the scope of this disclosure.

Finally, it should be noted that the above exemplary embodiments are only used to illustrate the technical solutions of this disclosure and are not intended to limit this disclosure. Although the disclosure has been described in detail with reference to the aforementioned exemplary embodiments, a person skilled in the art should understand that the technical solutions described in these embodiments can be modified or equivalent replacements for some or all of the technical features can be made. These modifications or replacements do not deviate from the scope of the technical solutions of this disclosure.

What is claimed is:

1. A method for controlling an aircraft, comprising:
obtaining a restricted flight altitude with respect to a take-off position of the aircraft; wherein the restricted flight altitude is related to height information, with respect to sea level, of a highest target in an area around the take-off position; and
controlling, based at least in part on the restricted flight altitude, the aircraft, such that a maximum altitude reachable by the aircraft is higher than a height of the highest target.

2. The method according to claim 1, further comprising:
obtaining the height information of the highest target in the area around the take-off position from a height map of the area around the take-off position.

3. The method according to claim 1, wherein the restricted flight altitude is greater than a relative height between the highest target and the take-off position.

4. The method according to claim 1, further comprising:
outputting the restricted flight altitude; or
sending the restricted flight altitude to a control terminal of the aircraft.

5. The method according to claim 1, wherein the height map of the area around the take-off position includes at least one of: a building height map of the area around the take-off position, or a terrain map of the area around the take-off position.

6. The method according to claim 5, wherein in response to the aircraft is located in an urban area, the height map of the area around the take-off position includes the building height map of the area around the take-off position.

7. The method according to claim 5, wherein in response to the aircraft is located in a non-urban area, the height map of the area around the take-off position includes the terrain map of the area around the take-off position.

8. The method according to claim 2, wherein the height map of the area around the take-off position is obtained from a server.

9. The method according to claim 1, wherein the height map includes a first height map generated based at least in part on sensor data collected by an aircraft flying in the area around the take-off position.

10. The method according to claim 1, further comprising:
determining whether the aircraft has a permission to set the restricted flight altitude;
in response to determining that the aircraft has the permission to set the restricted flight altitude, determining, based at least in part on the height information of the highest target, the restricted flight altitude of the aircraft relative to the take-off position, and the controlling, based at least in part on the restricted flight altitude, the aircraft including: controlling, based at least in part on the restricted flight altitude determined, the aircraft.

11. The method according to claim 10, further comprising:
in response to determining that the aircraft has no permission to set the restricted flight altitude, obtaining a fixed restricted flight altitude relative to the take-off position, and the controlling, based at least in part on the restricted flight altitude, the aircraft including: controlling, based at least in part on the fixed restricted flight altitude, the aircraft.

12. The method according to claim 10, wherein the determining whether the aircraft has the permission to set the restricted flight altitude includes:
determining, based at least in part on the take-off position, whether the aircraft has the permission to set the restricted flight altitude.

13. The method according to claim 10, wherein the determining whether the aircraft has the permission to set the restricted flight altitude includes:
determining, based at least in part on identity information associated with the aircraft, whether the aircraft has the permission to set the restricted flight altitude.

14. The method according to claim 10, wherein the determining whether the aircraft has the permission to set the restricted flight altitude includes:
determining whether an electronic certificate for setting the restricted flight altitude issued by a flight regulatory authority is obtained; and
in response to that the electronic certificate for setting the restricted flight altitude is obtained, determining that the aircraft has the permission to set the restricted flight altitude.

15. The method according to claim 10, wherein the determining whether the aircraft has the permission to set the restricted flight altitude includes:
In response to receiving an operation from a user to set the restricted flight altitude, determining whether the aircraft has the permission to set the restricted flight altitude.

16. The method according to claim 1, further comprising:
obtaining third-party map data; and
planning a return route for the aircraft based at least in part on the third-party map data to avoid obstacles.

17. The method according to claim 16, wherein the planning of the return route based at least in part on the third-party map data includes:
planning the return route of the aircraft based at least in part on the third-party map data to avoid obstacles under a condition including at least one of night, white walls, or glass.

18. The method according to claim 1, further comprising:
in a process of performing an automated task toward a target, planning the automated task based at least in part on the third-party map data to avoid obstacles.

19. A control device for controlling an aircraft, comprising:
at least one storage medium storing at least one set of instructions; and
at least one processor in communication with the at least one storage medium, wherein during operation, the at least one processor executes the at least one set of instructions to cause the control device to at least:
obtain a restricted flight altitude with respect to a take-off position of the aircraft; wherein the restricted flight altitude is related to height information, with respect to sea level, of a highest target in an area around the take-off position, and
control, based at least in part on the restricted flight altitude, the aircraft, such that a maximum altitude reachable by the aircraft is higher than a height of the highest target.

20. A non-transitory computer-readable storage medium, comprising a set of instructions for controlling an aircraft, wherein when executed by at least one processor, the set of instruction directs the at least one processor to perform:
obtaining a restricted flight altitude with respect to a take-off position of the aircraft; wherein the restricted flight altitude is related to height information, with respect to sea level, of a highest target in an area around the take-off position; and controlling, based at least in part on the restricted flight altitude, the aircraft, such that a maximum altitude reachable by the aircraft is higher than a height of the highest target.

\* \* \* \* \*